(12) United States Patent
Moy

(10) Patent No.: US 9,076,008 B1
(45) Date of Patent: Jul. 7, 2015

(54) CONTENT PROTECTION ON AN ELECTRONIC DEVICE

(75) Inventor: Steven Ka Cheung Moy, San Francisco, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 324 days.

(21) Appl. No.: 13/170,180

(22) Filed: Jun. 27, 2011

(51) Int. Cl.
  *G06F 21/62* (2013.01)
  *G06F 21/60* (2013.01)
  *G06F 21/31* (2013.01)

(52) U.S. Cl.
  CPC .............. *G06F 21/62* (2013.01); *G06F 21/60* (2013.01); *G06F 21/31* (2013.01); *G06F 2221/2141* (2013.01)

(58) Field of Classification Search
  CPC ....... G06F 21/10; G06F 21/31; G06F 21/629; G06F 2221/2141; G06F 21/60; G06F 21/62
  See application file for complete search history.

(56) References Cited

U.S. PATENT DOCUMENTS

| | | | |
|---|---|---|---|
| 5,544,360 A * | 8/1996 | Lewak et al. ......................... 1/1 |
| 6,633,981 B1 * | 10/2003 | Davis .......................... 713/189 |
| 2003/0097596 A1 * | 5/2003 | Muratov et al. ............... 713/202 |
| 2007/0016958 A1 * | 1/2007 | Bodepudi et al. ............... 726/27 |
| 2007/0073694 A1 * | 3/2007 | Picault et al. ..................... 707/9 |
| 2008/0215509 A1 * | 9/2008 | Charlton ......................... 706/11 |
| 2009/0160609 A1 * | 6/2009 | Lin et al. ...................... 340/5.83 |
| 2009/0241072 A1 * | 9/2009 | Chaudhri et al. ............. 715/863 |
| 2010/0275032 A1 * | 10/2010 | Bhangi .......................... 713/182 |
| 2011/0023128 A1 * | 1/2011 | Furuya ............................. 726/26 |
| 2011/0302211 A1 * | 12/2011 | Kilday et al. .................. 707/785 |

OTHER PUBLICATIONS iPhoneHeat, "How to Password Protect/Lock Applications on iPhone with LockDown," posted Jul. 20, 2009, 5 pages, Retrieved Jun. 11, 2013, Online: http://www.iphoneheat.com/2009/07/how-to-password-protect-applications-on-iphone/.*

M. Bassi, "Review: Lockdown Pro Password Protects Your iPhone Apps and Folders," posted Jun. 2, 2011, 7 pages, Retrieved Jun. 11, 2013, Online: http://www.simonblog.com/2011/06/02/review-lockdown-pro-password-protects-your-iphone-apps-and-folders/.*

(Continued)

*Primary Examiner* — Jung Kim
*Assistant Examiner* — Robert Leung
(74) *Attorney, Agent, or Firm* — Novak Druce Connolly Bove + Quigg LLP

(57) ABSTRACT

Some embodiments enable a user of an electronic device to selectively secure applications and/or content of the electronic device. For instance, certain embodiments enable a user to password protect applications (e.g., email, calendar, contacts, photos) within a single environment. In some embodiments, a user can selectively secure specific content (e.g., work-related email messages, personal emails, work-related calendar entries, corporate contacts) within an application. Further, some embodiments enable a user to specify which applications and/or types of content the user would like to password protect. For instance, a user that has sensitive work-related information stored on or accessible through the user's device may choose to password protect work-related applications (e.g., work email account) and content (e.g., work documents, work-related calendar entries). By allowing the user to selectively secure certain applications and/or content on the electronic device, the user's interaction with the device is improved and made more convenient.

23 Claims, 12 Drawing Sheets

(56) References Cited

OTHER PUBLICATIONS

A. Wells, "App Protector Android App Review," AndroidTapp.com, posted Mar. 26, 2010, 5 pages, Retrieved Jun. 11, 2013, Online: http://www.androidtapp.com/app-protector/.*

A. Wells, "Protector Android App Review," AndroidTapp.com, posted Mar. 15, 2010, 4 pages, Retrieved Jun. 11, 2013, Online: http://www.androidtapp.com/protector/.*

C. Johnston, "Ask Ars: Where should I store my passwords?" Ars Technica, posted on Mar. 7, 2011, Retrieved Jun. 12, 2013, Online: http://arstechnica.com/security/2011/03/ask-ars-where-should-i-store-my-passwords/.*

* cited by examiner

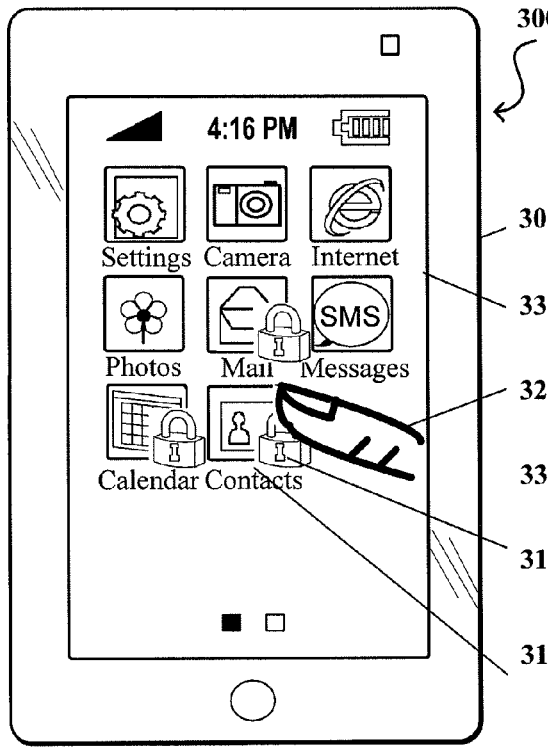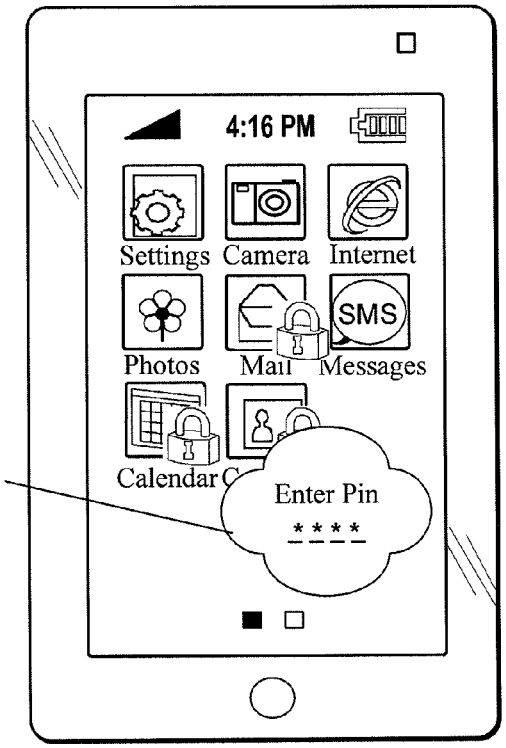
FIG. 3(a)　　　　　　　　FIG. 3(b)
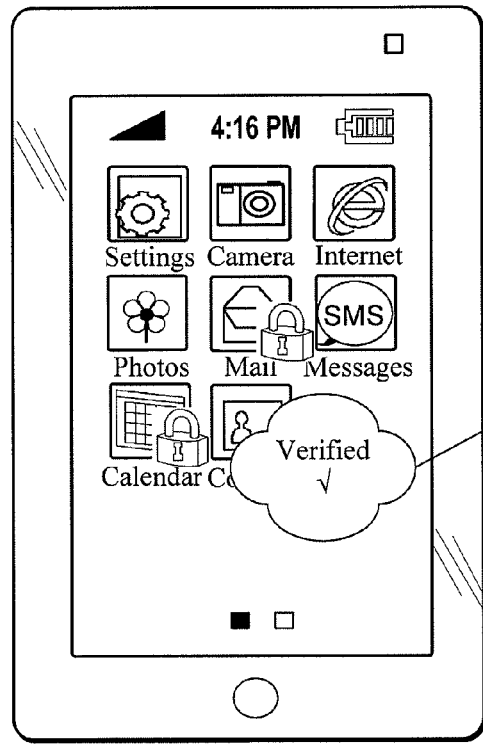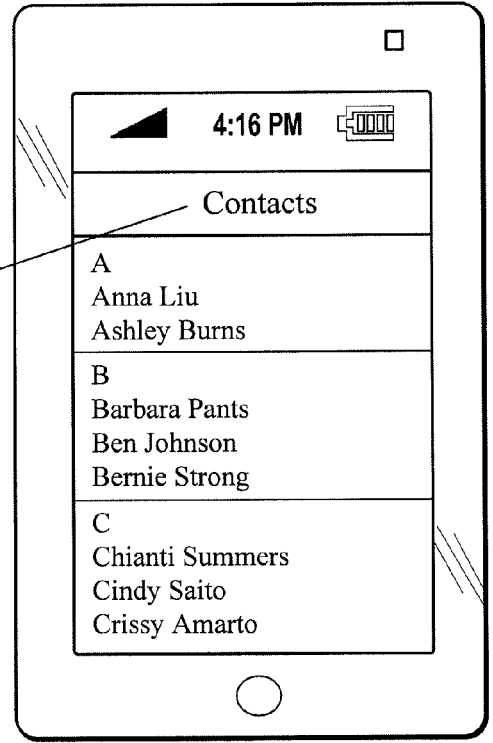
FIG. 3(c)　　　　　　　　FIG. 3(d)

CONTENT PROTECTION ON AN ELECTRONIC DEVICE

BACKGROUND

People are increasingly utilizing portable computing devices to perform various tasks, such as viewing a personal calendar, managing business contacts, checking email messages, taking photos, playing video games, or checking the weather. Many applications on a computing device (e.g., work calendar, personal email, business contacts) enable a user to access confidential information or information that the user would like to protect. At the same time, many other applications on the computing device (e.g., camera, calculator, navigator) provide functions that do not contain or give access to any confidential information that the user would care to protect. Thus, while having an overall password lock may secure access to all data on the computing device, the user may find it inconvenient to always have to unlock the overall device using the password even when accessing applications that do not contain any confidential information.

Further, while the user may want to lend the computing device to others to share applications that do not contain confidential information (e.g., video games, navigation information, photos), the user might feel uncomfortable when there is no way to protect or limit access to applications that may contain confidential information once the overall password is unlocked. Some conventional approaches enable a user to provide different passwords to protect each of a number of different applications or sources of data on the device, but the user might not appreciate having to enter a specific password each time the user wants to access one of these applications or sources.

BRIEF DESCRIPTION OF THE DRAWINGS

Various embodiments in accordance with the present disclosure will be described with reference to the drawings, in which:

FIGS. 3(a)-3(d) illustrate an example situation where a user may gain access to a password protected application on a device by inputting a valid pin number in accordance with various embodiments;

FIG. 7(a)-(f) illustrate unlocking calendar entries that include content from two different sources, each calendar entry requiring a different password to unlock in accordance with various embodiments;

DETAILED DESCRIPTION

Systems and methods in accordance with various embodiments of the present disclosure may overcome one or more of the aforementioned and other deficiencies experienced in conventional approaches for protecting information, data, or other functionality or content on a computing device. In particular, certain embodiments provide for the selective protection of confidential information or other content on a mobile device using a common unlock or access mechanism. Approaches in accordance with various embodiments enable a user to have convenient access to specific content (e.g., non-confidential information or standard applications) on a mobile device, while controlling access to other selected content (e.g., confidential information or pay-for-use services) using a single device access or unlock mechanism (e.g., a PIN, password, or gesture input).

More specifically, at least some embodiments do not rely on an overall password to restrict access to applications that contain confidential information. Instead, a user is allowed to access all applications that are not "locked" without having to, for example, enter a password. Only when a user attempts to access a "locked" application or protected content, for example, will he or she be prompted to enter a password or otherwise provide authentication. In this way, the user's overall interaction with the mobile device is improved.

While the device of some embodiments may restrict access to various applications that are within the same environment, some embodiments may restrict access to different types of data within one or more applications. For instance, a user's email application may pool emails from the user's personal email account (e.g., Gmail® account) and the user's work email account (e.g., corporate Exchange account, etc.). The device of some embodiments may require the user to "unlock" a particular type of content (e.g., emails retrieved from the work server) when the user attempts to access the particular type of content. The device may allow the user to access other types of data within the application without having to provide authentication.

Moreover, in certain embodiments, the user may specify which applications and/or which types of data within applications to "lock" or require authentication before the user may access the contents of those "locked" applications and/or data. In some embodiments, the user may adjust the security level privileges (e.g., the applications and/or data to lock, the manner of authentication that is required) through a preference setting on the device.

Various other applications, processes and uses are presented below with respect to the various embodiments.

Figure 1:
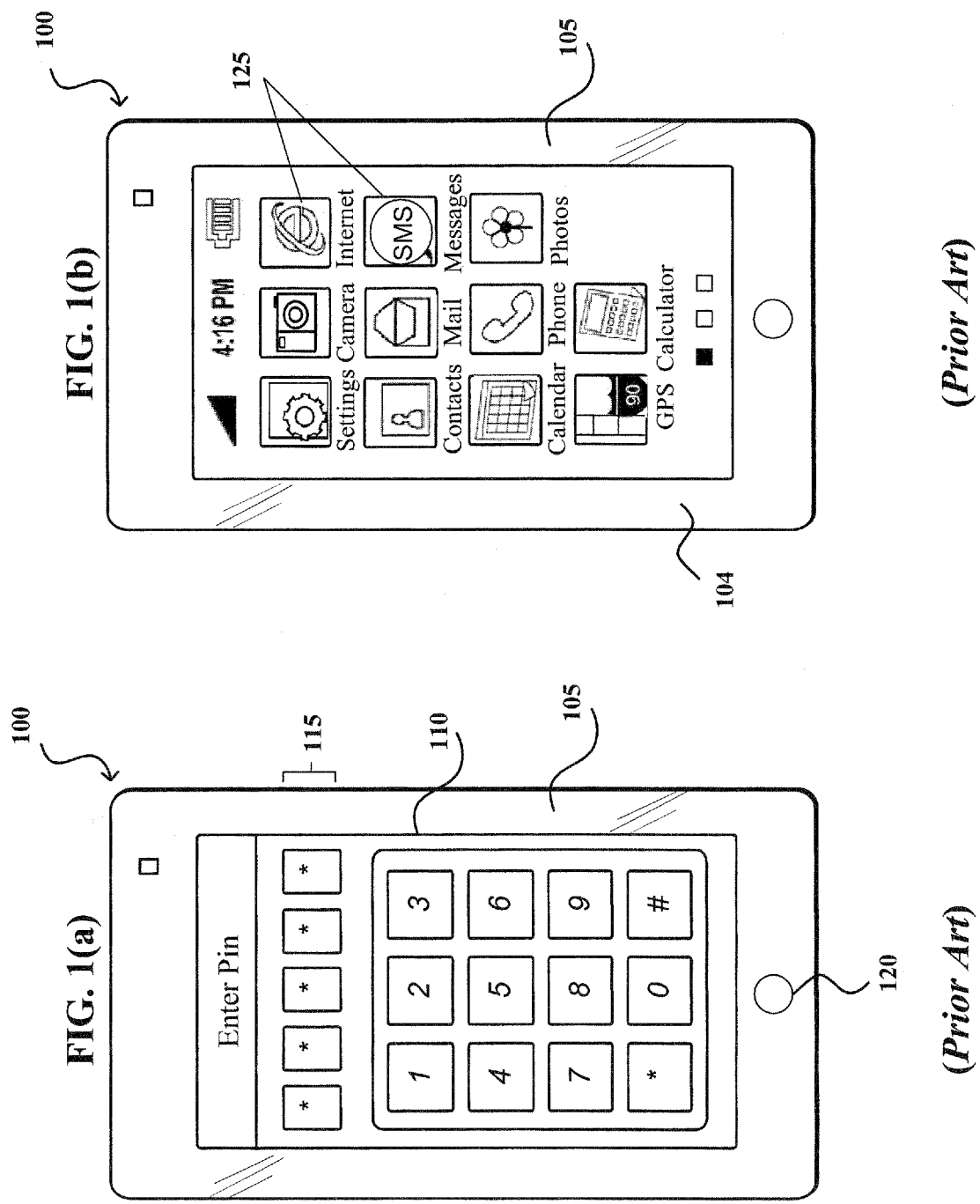
FIGS. 1(a) and 1(b) illustrate an example situation of how a user of a portable computing device traditionally protects confidential information on a portable computing device in accordance with various embodiments.

FIGS. 1(a)-1(b) illustrate an example situation 100 of how to protect confidential information on an electronic device 105 using conventional approaches. As described above, some embodiments require a user of the device to enter a valid pin in order to gain access to all applications on the device. FIG. 1(a) illustrates that, conventionally, a user of a device 105 may enter a pin (e.g., through a touchpad 110 on the device 105) to unlock the contents of the device 105. Here, the user has entered a five-digit pin as indicated by the asterisks in the pin entry field 115. The user may not be able to access any data, applications, or functionality on the device 105 until the user provides a valid pin that unlocks the overall password lock. In some embodiments, the user is prompted to enter the pin upon activation of the device (e.g., when the user selects the button 120).

FIG. 1(b) illustrates that upon verifying the password, the device of some embodiments displays the applications on the device. In this example, the device 105 verified the pin received from the user in FIG. 1(a). As shown, upon verifying the password, the device 105 displays the various icons 125 on a home screen of the device 105. The various icons 125 are user-selectable items that enable the user to access content of applications on the device 105 without requiring the user to provide further authentication. In this example, the home screen displays a settings icon, a camera icon, an Internet icon, a contacts icon, a mail icon, a messages icon, a calendar icon, a phone icon, a photos icon, a navigator icon, and a calculator icon. Different embodiments may display a different set of icons on a screen of the device.

In some situations, the user may find it inconvenient to have an overall password lock protecting all the content on the device. The user may want targeted protection protecting only those applications that may contain confidential or sensitive information. At the same time, the user may want to have quick and easy access to other applications without always having to unlock the device. For instance, the user may not want to have to unlock the device when he just wants to use the camera function to quickly snap a shot of a bird flying by. In another instance, the user may want to use the calculator function to quickly calculate tip for a cab driver upon arrival of his destination. Because, in many instances, functions that the user would like to access are not functions that contain sensitive or confidential information, it can be extremely inconvenient for the user to have to unlock the device every time he wants to access these functions.

Further, in some situations, the user may want a friend or family member to be able to access certain applications on the user's device without worrying about exposing confidential or sensitive information (e.g., personal or work emails, business contacts, work calendar, etc.) that may be stored on or accessible through certain applications on the device. For instance, the user may want a friend to use the navigator on the user's device to give the user driving directions to a destination. By inputting the pin to unlock the overall password, the user would not only be providing access to those applications that do not have any confidential information, but also to those applications that the user may not want the friend to have access.

Hence, as explained above, a user may find an overall password (e.g., a mobile phone operating system password) that locks/unlocks all applications on an electronic device to be inconvenient in at least in some scenarios. Moreover, aside from the overall password, application-specific passwords, such as a password for an email application, may not offer the protection a user desires. First, an application-specific password only protects the content of the particular application. Second, not all applications have built-in password protection and the user has no way of guarding the content of those applications once the overall password has been unlocked.

Different from the overall password in conventional systems that locks/unlocks all applications on an electronic device and the application-specific password that protects only the application-at-issue, certain embodiments use a customizable security feature that allows a user to selectively shield one or more applications, functions, types of data, or other such content that she or he would like to secure or control access.

Unlike the overall password that has to lock/unlock all applications at once, the customizable security feature offers greater flexibility and enables a user to secure, for example, only specific programs. Further, in contrast to the application-specific password, the protection offered by the customizable security feature is not limited to specific applications only and can secure multiple applications at once. In this way, the customizable security feature offers a user the benefit associated with the overall password (e.g., allows the user to secure multiple applications with one password) without the downside (e.g., forces the user to either lock or unlock all applications at once). Furthermore, the customizable security features offers protection to applications that do not have built-in application passwords and adds an additional layer of security for applications that already employ application-specific passwords.

In some embodiments, the customizable security feature can be an operating system level security feature. In certain embodiments, the customizable security feature is an application level security feature. In one example, regardless of whether customizable security feature is implemented at an operating system level or at an application level, it is designed in such a way so that it has the capability to secure one or more applications on the electronic device.

The customizable security feature, in one example, is an operating system level password protection that enables a user to lock/unlock one or more applications on an electronic device. In another example, the customizable security feature is an application level biometric-based authentication mechanism (e.g., voice recognition) that enables a user to lock/unlock one or more applications on a mobile phone. In yet another example, the customizable security feature is a cross-application pin that can be utilized to lock/unlock multiple applications. As explained in greater detail below, while the customizable security feature can be utilized to lock/unlock one or more applications, its application is not so limited. Indeed, the customizable security feature can be used to lock specific confidential content within one or more applications. For example, the customizable security feature can be used to lock all work-related email messages within an email application while leaving non-work-related email messages unlocked.

Certain embodiments enable selective content protection in a single environment. Some embodiments provide a single environment that password protects some applications and not others. In order to access the password protected applications and data in the single environment, the user must show that he has been given the authority to access the protected applications and data (e.g., through entering a valid pin, through different biometric recognition techniques, such as fingerprint recognition, facial recognition using VeriFace®, signature detection, retinal scan, etc.). On the other hand, the device does not require the user to unlock those applications in the single environment that are not password protected. This enables the user to quickly and conveniently access those applications that do not contain any confidential or sensitive information while providing sufficient protection to those applications and data that may contain confidential information from unauthorized users.

For instance, the device of some embodiments password protects applications such as personal and work email messages but leave the camera application unprotected, enabling the user to pick up the device, start the application, and snatch a photo without wasting the time and energy to unlock the application.

Further, some embodiments enable the user to configure the application and/or data on the device that are locked and unlocked. The user may identify applications or types of data on his device that he wants to shield from unauthorized users, such as friends or family members. In this way, certain embodiments of the invention allow the user to do away with the inconvenient overall password lock while extending protection to applications that the user wants to keep confidential.

Figure 2:
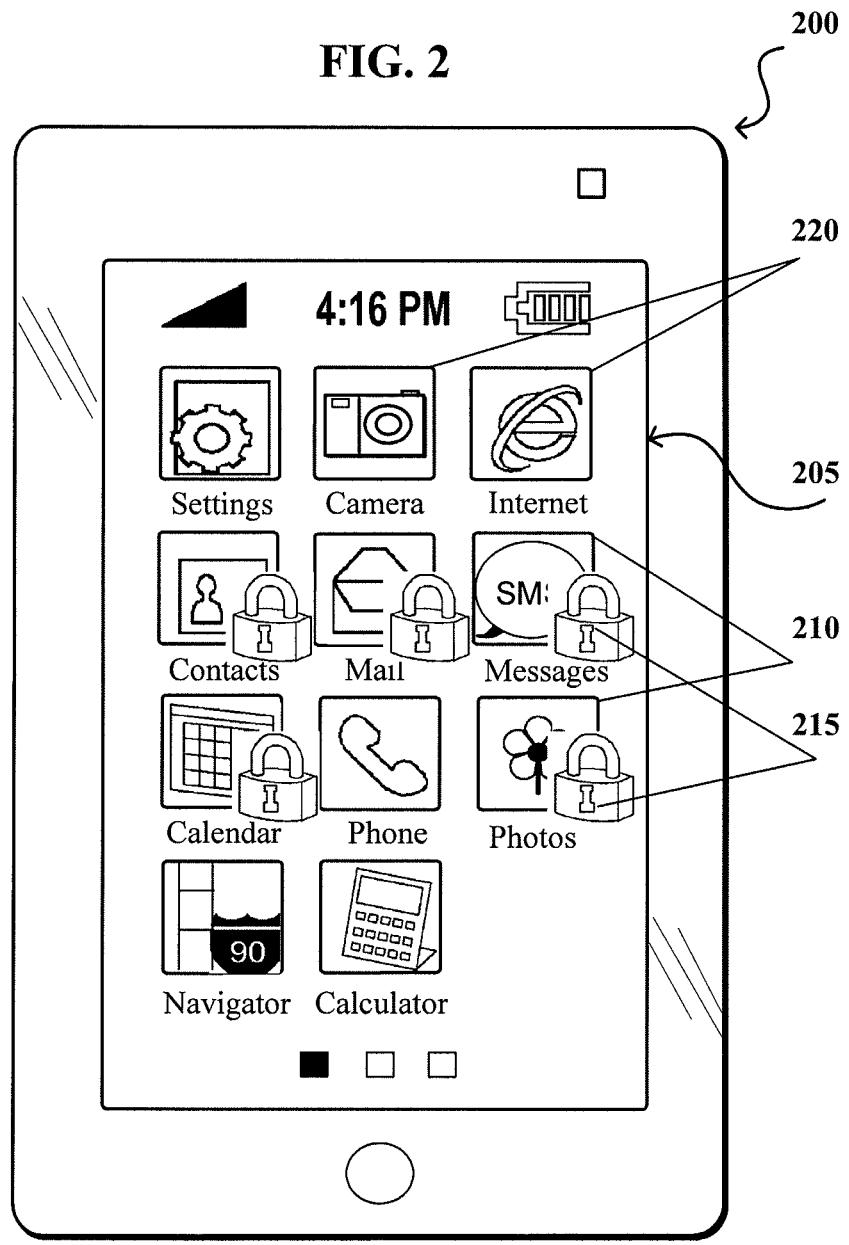
FIG. 2 illustrates an example of a home screen of a device displaying a number of icons with and without lock indicators in accordance with various embodiments.

The electronic device of some embodiments generates a display that includes multiple icons and lock indicators that indicate which applications are password protected. FIG. 2 illustrates one such example of a home screen of a device 205 displaying a number of icons 210 with lock indicators 215 and a number of icons 220 without lock indicators. As shown in this example, the icons 210 with lock indicators 215 include the contacts icon, the mail icon, the messages icon, the calendar icon, and the photos icon. Different embodiments may present a different set of locked and unlocked icons, or other representations of the protections or accessibility of certain content or functionality. For example, an accessible icon might be in full color while a protected icon might be presented in grayscale. In other embodiments, certain icons associated with protected content might not be displayed at all until an unlock mechanism is provided. Various other approaches can be used as well as discussed and suggested elsewhere herein.

Some embodiments lock applications for various reasons. One reason may be that, in order to enable a user to access particular applications, a security policy of the application requires the user to enter a security pin. For example, the Microsoft® Exchange Server protocol includes a security policy that mandates users to enter a security pin to access an exchange account on the mobile device. Another reason may be to prevent unauthorized users from accessing those applications that may contain confidential or sensitive information. For example, the user may not want his coworkers to see his personal photos, or his friends to have access to his company directory. Therefore, password protecting applications and/or data helps to prevent unauthorized users from accessing those applications and/or data.

Some embodiments leave a number of other applications that may not contain confidential information unlocked. In this example, several icons 220 including the settings icon, the camera icon, the Internet icon, the phone icon, the navigator icon, and the calculator icons are left unlocked. Different embodiments may have a different set of unlocked applications. The user may access these unlocked applications without entering a pin, thereby saving the user from having to unlock the overall password lock. Further, this allows the user to lend his device to others to allow them to use the unlocked applications without worrying that others would have access to the confidential information on the device.

As mentioned above, the user of the device may configure the security settings on the applications (e.g., through a preferences setting on the device). Some embodiments allow the user to designate the applications that require security protection and those that do not require security protections and are accessible by anyone. Further, some embodiments allow the user to customize the device such that the user may lock a different set of applications when lending the device to different persons. In one example, the user may want to restrict access to a first set of applications (e.g., personal calendar and personal photos) when lending the device to a coworker. In another example, the user may want to restrict access to a second set of applications (e.g., company directory and work email) when lending the device to a friend.

A setup such as the one described in FIG. 2 above enables the user to have quick and easy access (i.e., without having to unlock an overall password lock) to applications that do not contain confidential information while password protecting other applications that may contain or give access to confidential information. This setup provides the amount of protection needed by a user of a device in protecting confidential or sensitive information on the device even when others are using the device.

FIGS. 3(a)-3(d) illustrate an example situation 300 where the user may gain access to password protected applications on a device 305 by inputting a valid pin number. As mentioned above, a user of an electronic device may obtain access to protected applications through various identification techniques, such as by inputting a valid pin, through gesture recognition, fingerprint recognition, voice recognition, iris scan recognition, retinal scan recognition, and/or other biometric recognition techniques, etc. FIG. 3(a) illustrates the selection of the contacts icon 310 on the display of the device 305 (e.g., through tapping an area within the display 330 with a finger 320). The contacts icon 310 in this instance is password protected, as indicated by the lock symbol 315. Different embodiments may indicate the locked status of a piece of data or object using different visual indicators, such as by drawing a border around the icon, by displaying an exclamation mark symbol, by providing a motion-based feedback to the user (e.g., vibration), etc.

FIG. 3(b) illustrates that upon selection of a locked icon, a device of some embodiments requires the user to identify that he is authorized to access the contents of the application represented by the icon. In some embodiments, the user may input a pin to access this application, or the user may perform some motion input that may allow the device to verify the user's identity. As shown in this example, the user is prompted to enter a pin in order to show that he is authorized to access the contents of the application. Here, the user has entered a four-digit pin, indicated by the asterisks, in the entry field of the prompt 335. In one example, the pin is not an application-specific pin but can be used to lock/unlock one or more applications on the device. Some embodiments may allow the user to authenticate and gain access through other verification means, such as through fingerprint identification, etc.

FIG. 3(c) illustrates that the entered password has been verified. In some embodiments, the device verifies the validity of the entered pin by comparing the entered pin with a pin that is stored locally on the device. Some embodiments compare the entered pin with a pin located on a remote server. Different embodiments may perform the password verification differently. In this example, upon verifying the validity of the pin, the display screen 330 of the device 305 displays an animated indicator 325 indicating to the user that the user's pin is valid. Different embodiments may indicate the authentication to the user differently. Some embodiments may skip this stage and directly launch the application upon verification of the pin.

FIG. 3(d) illustrates that the user has gained access to the application and may now freely navigate through the contents of the unlocked application. As shown, the contacts list 340 is now displayed on the display 330 of the device 305. In some embodiments, the user may set additional limitations on access to particular groups of contacts. For example, the user may set a lock on access to his personal contacts. In this instance, the user may be required to enter another pin before she can access more information on a specific personal contact. To ensure that unauthorized users would not have access to the user's personal information, others going through the user's device would also be required to input a valid pin in order to access information on the user's personal contacts.

Figure 4A:
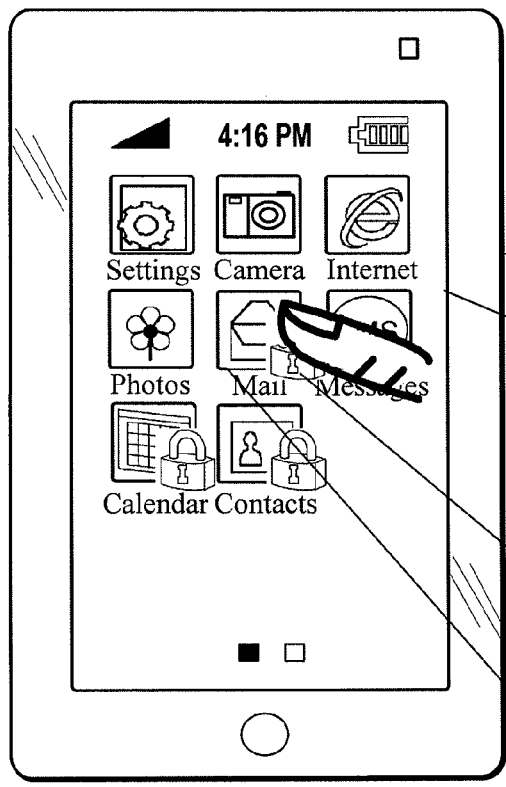
FIGS. 4(a)-4(c) illustrate another example situation where a user obtains access to a password protected application on a device by inputting a valid pin number in accordance with various embodiments.
Figure 4B:
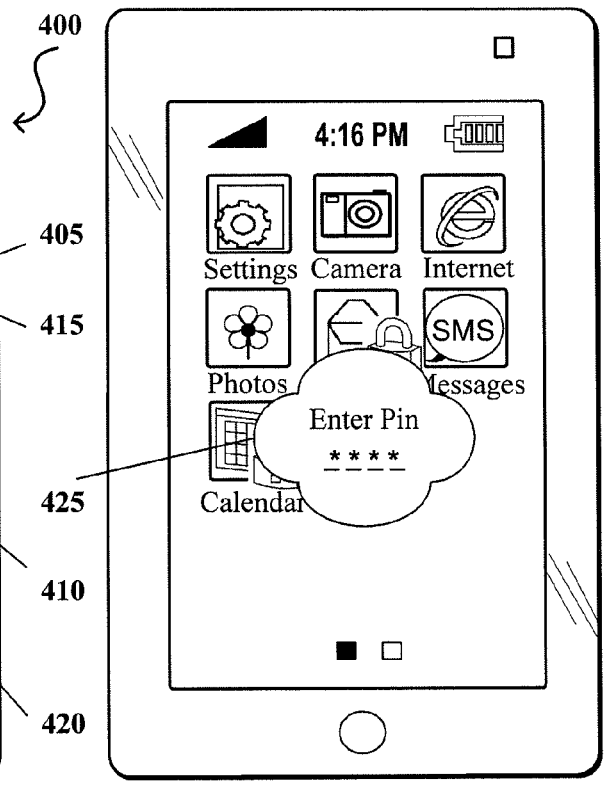
Figure 4C:
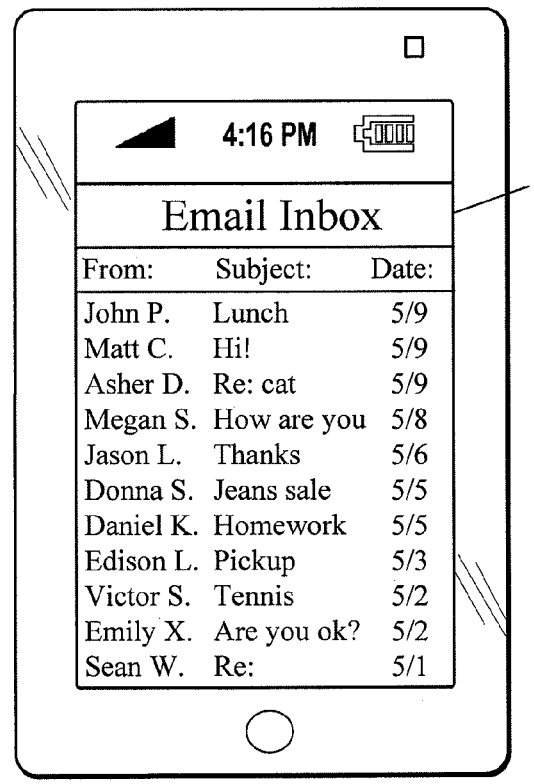

FIGS. 4(a)-4(c) illustrate another example situation 400 where the user obtains access to an email application on a device 405 by inputting a valid pin number. Similar to the above, the device of some embodiments may provide an environment with locked and unlocked objects. The user may unlock objects or gain access to protected applications through various identification techniques, such as by inputting a valid pin, through iris identification, through facial recognition, etc. FIG. 4(a) illustrates the selection of the email icon 410 on the display 415 of the device 405 (e.g., through physically contacting an area within the display 415). The email icon 410 in this instance is password protected, as indicated by the lock symbol 420. As mentioned above, different embodiments may use different approaches to indicate that an object is locked. For example, some embodiments may indicate that an object is locked by graying out the object or by drawing a border around the icon object, etc. Some embodiments may not indicate that a locked object is locked with any visual indicators, but also may prompt the user to enter a pin upon the user's selection of the object.

FIG. 4(b) illustrates that upon selection of the locked email icon, the device of some embodiments requires the user to enter a password identifying that he is an authorized user. As mentioned above, different embodiments allow the user to identify himself as an authorized user differently, such as by allowing the user to swipe his fingerprints against a biometric sensor of the device, etc. As shown in this example, the user has entered a four-digit pin in the pop-up window 425. In certain embodiments, the authentication mechanism that allows the user to identify herself as an authorized user, whether password/pin-based or biometric-based, is not specific to a particular application but instead is a mechanism that secures access to multiple applications on the device.

FIG. 4(c) illustrates that upon verification of the user's password, the display screen 430 displays the contents of the user's email application. As mentioned above, the device may verify whether the entered pin is valid by comparing the entered pin with a pin that is stored locally on the device. Some embodiments compare the entered pin with a pin stored on a remote server. Different embodiments may perform the password verification differently. In this example, upon verifying the validity of the pin, the display screen 430 displays the home page of the email application, from which the user may then access the contents in the email application. If the device determines that the user's pin is invalid, the device of some embodiments may allow the user to re-enter a pin. In some embodiments, the device prevents the user from being able to enter a pin altogether after the user fails to enter the correct pin one or more times.

Moreover, the device of some embodiments provides additional layers of security to further protect certain types of sensitive content. For instance, the user's email account may receive emails from different server accounts (e.g., personal Gmail® account, multiple work accounts, etc.). Some embodiments may create an additional security layer within the email application for work-related emails that are retrieved from, e.g., a company's exchange server. In such cases, even after the user correctly entered a first password and gained access to the email application, when the user tries to read a work-related email retrieved from the company's exchange server, the email application will prompt the user to enter a second password before displaying the content of the email message.

While the device of some embodiments is capable of locking different applications, the device is also capable of locking different types of data within an application. Some embodiments allow a user to access certain applications without requiring the user to input a password, but require the user to authenticate his identity when the user wants to access certain types of data within the application. FIGS. 5(a)-5(d) illustrate an example situation 500 where the user may start an application without inputting a password, but is required to enter a password when accessing particular types of data within the application.

Figure 5A:
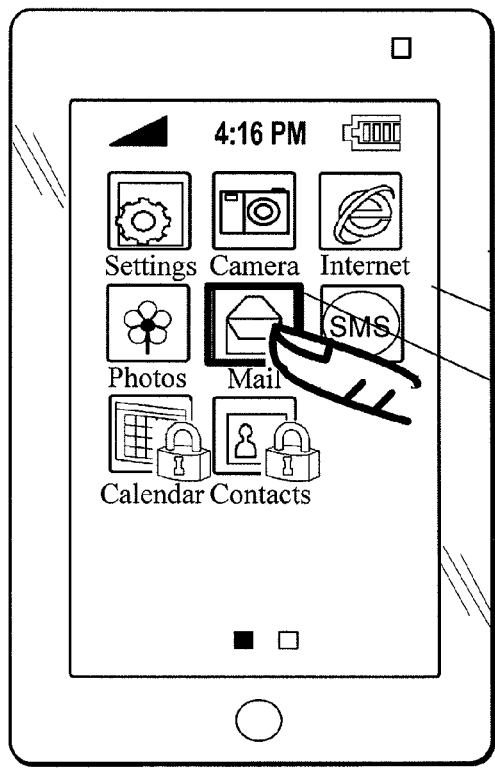
FIGS. 5(a)-5(d) illustrate an example situation where a user may start an application without inputting a password, but is required to enter a password when accessing particular types of data within the application in accordance with various embodiments.

FIG. 5(a) illustrates the selection of an email application icon 510 on the user's device 505. In some embodiments, the user performs the selection through a cursor controller operation, through a keyboard input, etc. Some embodiments indicate the selection of the application through a highlighting of the icon, through a bordering of the icon, etc. In this example, the user has selected to access the email application by selecting the icon 510 on the display screen 515 (e.g., using a finger). The selection of the email application is shown through a bordering of the icon 510.

Figure 5B:
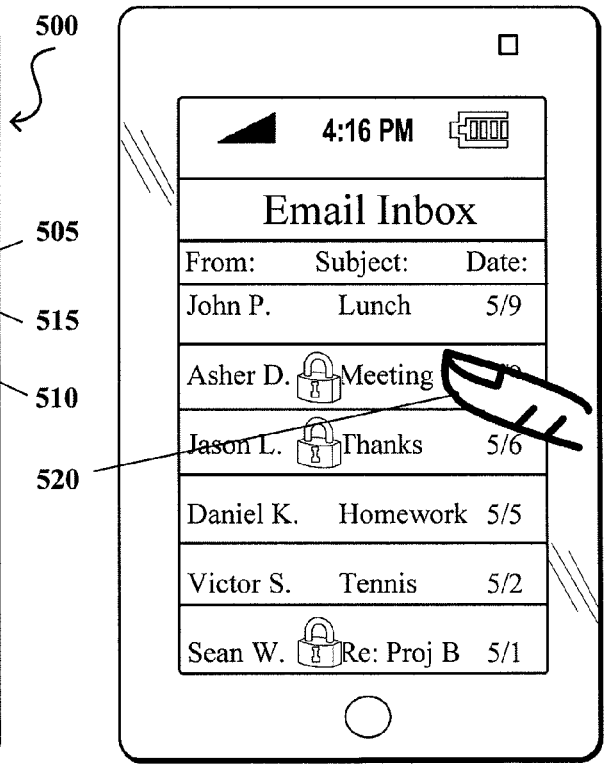

FIG. 5(b) illustrates that upon selection of the email icon, the device of some embodiments launches the application and displays the content of the application. In some embodiments, the device displays a pop-up window, requiring the user to input a valid pin prior to launching the application. In some embodiments, the pin is an operating system level pin that can be utilized to secure one or more applications and is not an application-specific pin. In this example, the device 505 displays the inbox of the email application upon the user's selection of the email icon 510 without requiring the user to input a pin. As shown, the user is selecting a particular email entry 520 to display the contents of the particular email entry.

Figure 5C:
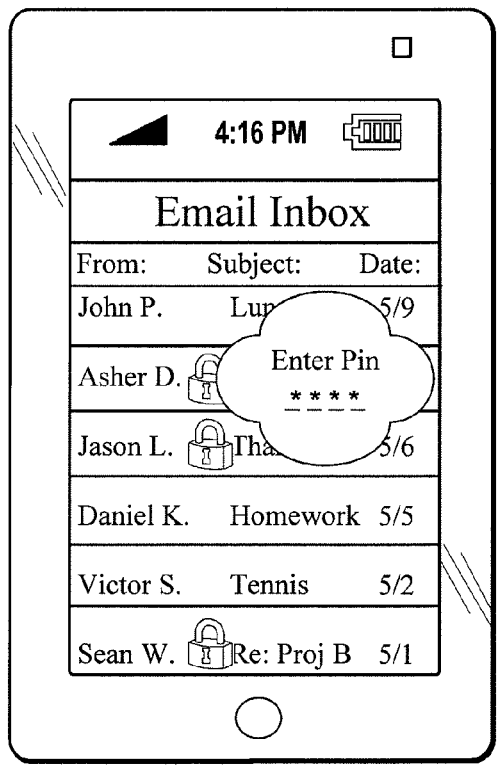
Figure 5D:
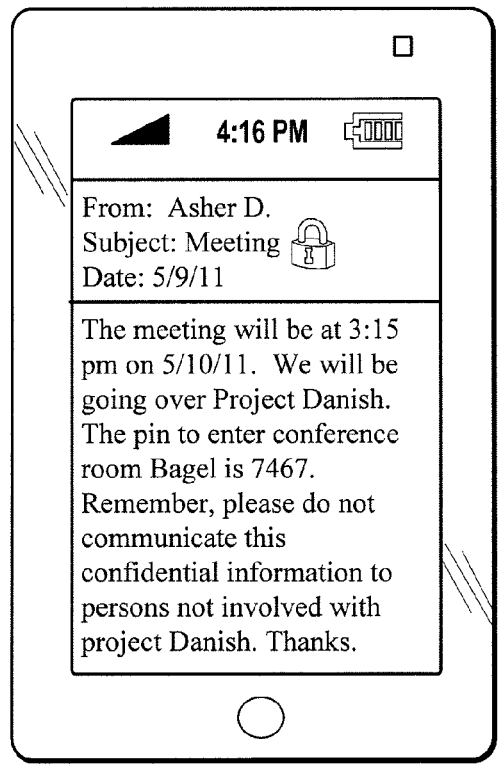

FIG. 5(c) illustrates that upon the user's selection to view a particular email, the device of some embodiments prompts the user to input a valid pin in order to have access to the contents of that particular email. In some embodiments, the device may require a user to enter a valid pin to access certain types of data. In some embodiments, the valid pin is an operating system level pin or a cross-application pin that can secure access to one or more applications. Different embodiments may identify the different types of data differently. In some embodiments, the device may categorize data using the metadata tagged to each individual piece of data. For example, the device may distinguish emails retrieved from an Amazon® email server from emails retrieved from a personal email account (e.g., Gmail® account) by looking at the metadata associated with each received email. In another example, when an email application allows a user to access multiple inboxes associated with different email addresses (e.g., joe@work.com, joe@personalmessages.com), all emails associated with a particular inbox may be designated as confidential and require a user to enter a valid pin to gain access.

In addition, instead of categorizing data by their source, some embodiments may categorize data based on particular groups of people. For instance, the email application may require the user to provide a valid pin when the user tries to access email messages from certain pre-defined email addresses (e.g., family@abc.com, goodfriend@def.com). As shown, the user has input a four-digit pin in the entry field 525 as indicated by the asterisks.

FIG. 5(*d*) illustrates that upon verifying the pin, the contents of the particular email are displayed. In some embodiments, the user has access to the contents of all the emails that are within the same category after unlocking the pin to the category. Some embodiments require the user to input a pin every time the user tries to open an email that is considered confidential or sensitive. Different embodiments may set the security settings differently.

Figures 6A, 6B, 6C:
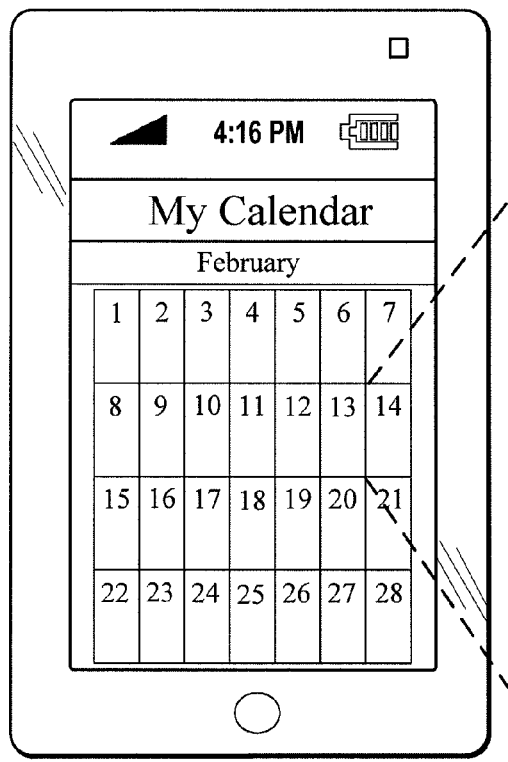
FIGS. 6(a)-6(c) illustrate an example of requiring a user to enter a valid pin to access certain contents or data within an application in accordance with various embodiments.

While the email application may require the user to enter a valid pin to access the content of certain types of emails (e.g., work emails), other applications such as a calendar application may also require the user to enter a valid pin to access certain types of entries within the user's calendar. FIGS. 6(*a*)-6(*c*) illustrate an example of requiring a user to enter a valid pin to access certain contents or data within an application. FIG. 6(*a*) illustrates a calendar application on a mobile device 605 with an enlarged view of one of the days (i.e., 13$^{th}$ of February) within the calendar month. In this example, the user has selected a calendar entry 610 that may include confidential information (e.g., work-related functions) as indicated by the lock symbol 615.

The user may determine his general schedule without having access to the details of each of the events listed on his calendar. In some instances, the user may have a unified calendar account, whereby the unified calendar account is the product of syncing many of the user's calendars, such as the user's work schedule, personal schedule, class schedule, workout schedule, etc. As described above, the different types of schedules may be classified using the metadata of each piece of data. The device of some embodiments may then categorize some types of data (e.g., using their metadata) as confidential. In this example, the device has categorized work schedule as confidential information, thereby requiring user authentication before displaying the contents of work schedule entries.

FIG. 6(*b*) illustrates that upon selection of a locked event, some embodiments enable the user to enter a pin to verify that the user has authority to access the content of the locked event. The device of some embodiments enables the user to enter the pin by displaying a pop-up box with entry fields. In this example, the user has entered a four-digit pin in the entry fields within the pop-up box 620, as indicated by the asterisks. FIG. 6(*c*) then illustrates that the device of some embodiments displays the content of the selected event upon verification of the received pin.

As described above, the valid pin may unlock an entire category or type of data. For instance, upon verifying a pin for work schedule category, the device of some embodiments allows the user to access all of the events that fall within the work schedule category. In some embodiments, the valid pin may unlock only the particular event while requiring the user to enter the pin again if the user wants to access the content of another event within the same category.

Also, in some embodiments, an application may allow a user to use one password to protect one category of data within the application. In certain embodiments, an application may allow a user to use different passwords to protect and prevent unauthorized access to different categories of data. For instance, the user may be involved in multiple projects, each project containing confidential information that the user may want to protect. The user may set different passwords for each project, thereby requiring different valid passwords to be able to access the different applications.

FIG. 7 illustrates unlocking calendar entries that include content from two different sources, each calendar entry requiring a different password to unlock. In some embodiments, an application may receive content from multiple sources so as to enable a user of the application to view content from multiple sources using a single, unifying application. For example, a user may have multiple calendar accounts for work and personal use. A calendar application may pool the content from the user's different calendar accounts (e.g., by retrieving the schedule from each calendar account's server) to display the user's scheduled events from multiple accounts to the user in a single application. As described above, events from a particular source may be password protected and require a user to enter a pin in order to retrieve the details of those events. Some embodiments may require the user to enter different pins to view the details of calendar events having different sources. In at least some embodiments, the user might utilize a work password and a personal password, where entering the work password provides access to all work-related content as specified by the user or otherwise designated, and entering the personal password provides access to all personal protected content as specified by the user or otherwise designated, etc.

FIG. 7(*a*) illustrates an example of content from different calendar entries being protected by different pins. In some embodiments, the user may have schedules or calendar entries retrieved from different servers. For example, the user may store his personal calendar on one server and his work calendar on another server. In another example, the user may have a work-related calendar entry from a first work server and another work-related calendar entry from another work server. In order to access the details of the scheduled entries from the different servers, some embodiments require the user to use different pins to access contents retrieved from the different servers.

In this example, the calendar shows that the user has scheduled events from 7-8 am, 10-3 pm, 3-5:30 pm, and 5:30-8 pm, with the event details from 10-3 pm and 3-5:30 pm blocked out. As shown, the 10-3 pm and 3-5:30 pm entries 720 and 725 each have a lock indicator displayed in each entry, indicating their locked status. Further, the entries 720 and 725 each have a different shading, indicating that the different entries require the user to enter different pins to access the contents of each entry. Different embodiments may display the entries as requiring different passwords differently. For example, in some embodiments, the application may display entries requiring one password as having a black border and entries requiring another password as having a blue border.

Here, similar to FIG. 6(*a*), the user selects the entry 720 from 10-3 pm by tapping the portion of the screen that corresponds to the 10-3 pm slot within the schedule. As described above, the user may perform this selection in other ways such as through a cursor controller operation, through a keystroke operation, etc.

FIGS. 7(*b*)-7(*c*) are similar to FIGS. 6(*b*)-6(*c*) in FIG. 6. In FIG. 7(*b*), the user is prompted to enter a pin in order to obtain access to the contents of the entry from 10-3 pm. FIG. 7(*c*) illustrates that upon entering a valid pin, the content of that calendar entry is revealed to the user. In some embodiments, all the calendar entries that may be unlocked by the same password are unlocked and displayed upon the user's unlocking one of the calendar entries. Some embodiments only display the contents of the particular entry that the user unlocked.

Figures 7A, 7B, 7C, 7D, 7E, 7F:
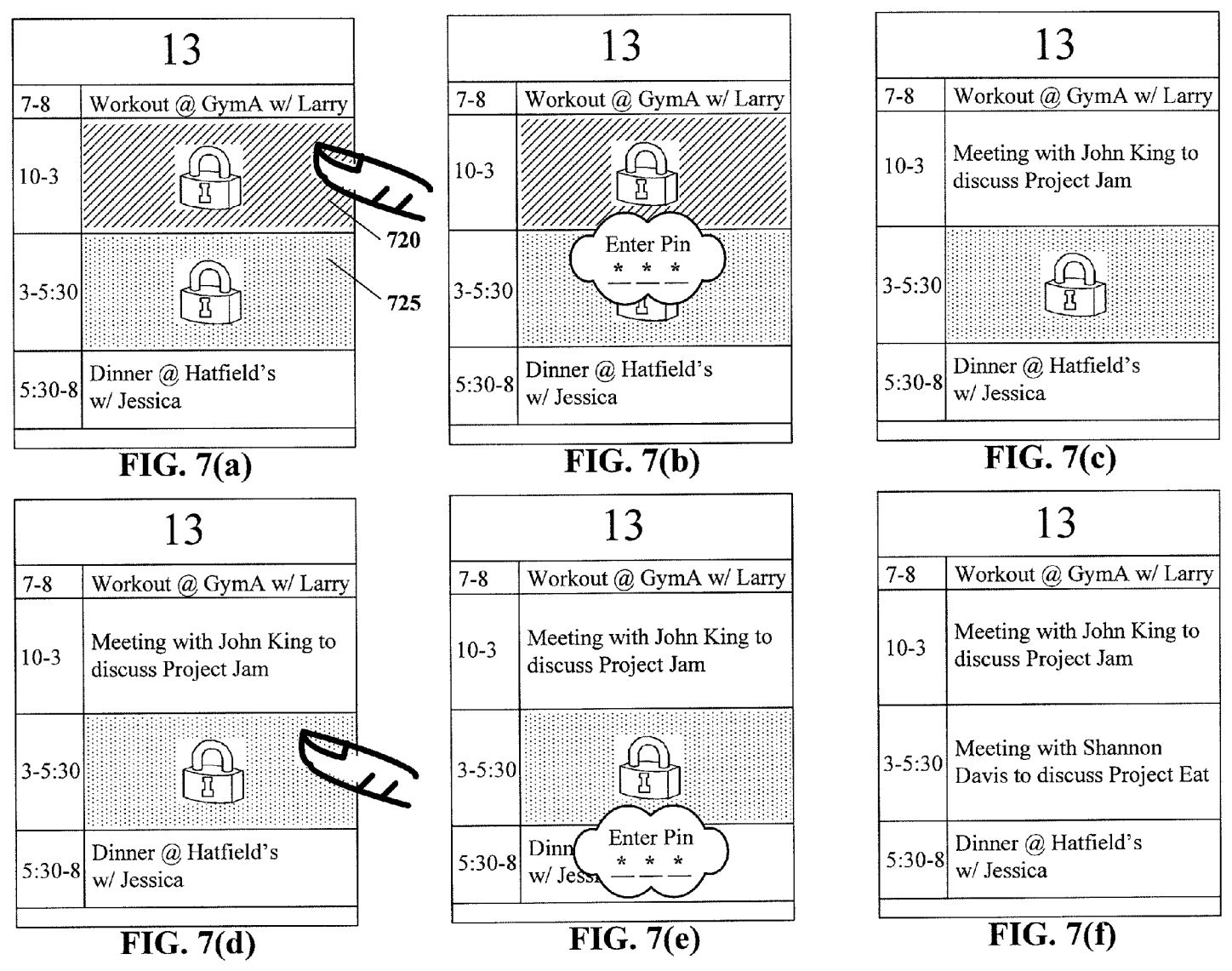

FIG. 7(*d*) illustrates the user selecting the entry 725 from 3-5:30 pm by tapping on the entry. As described above, the user may select the entry through a keystroke operation, a cursor controller operation, etc. FIG. 7(e) illustrates that upon the user's selection of the entry 725, the application displays a prompt requiring the user to enter another password to view the contents of the entry. As some embodiments require different passwords for accessing content retrieved from different servers, the user is prompted to enter a pin when the user attempts to retrieve the contents of either entry.

FIG. 7(f) illustrates that the application displays the contents of both entries 720 and 725 after the user has entered valid pins for both entries. As mentioned above, some embodiments unlock all the entries within the calendar that may be unlocked with the same password upon the user's unlocking of one of the entries. Some embodiments only unlock the particular selected entry after the user has entered a valid pin for that particular entry.

Although in some embodiments, content is categorized by the physical source of the content (i.e., different servers), some embodiments categorize content by the type of sources such as companies (e.g., Facebook®, Twitter®, Foursquare®, etc.), persons (e.g., family members, co-workers, etc.), and any other factors one may use to categorize different types of data. This enables the user of the device to lock content from a particular type of source (e.g., LinkedIn® messages) in a particular application that pools content from multiple sources of data (e.g., a "social networking application" that encompasses all messages and/or texts from multiple social networking entities of which the user is a member).

Figure 8:
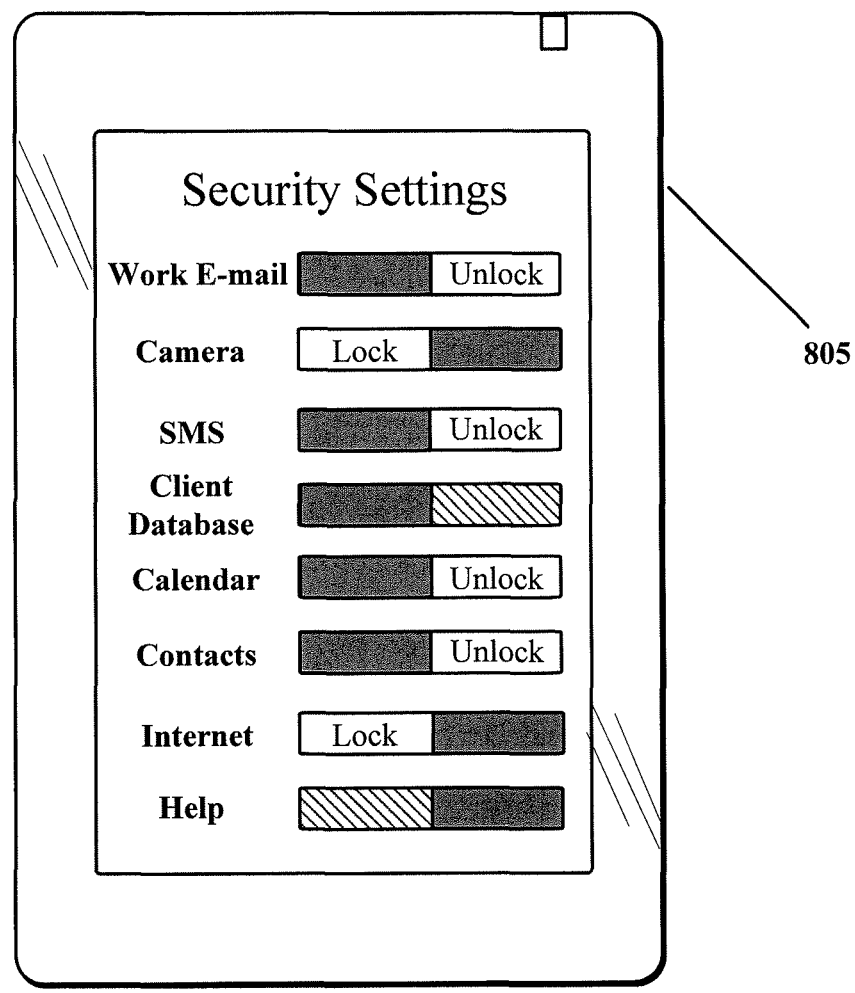
FIG. 8 illustrates an example of how a user of a device may configure the security settings for different applications on the device in accordance with various embodiments.

FIG. 8 illustrates an example of how a user of a device may configure the security settings for different applications on the device. The user of the device may want to configure the device such that access to particular applications and/or data would only be given to those with a valid pin, while unprotected applications and/or data are accessible without requiring the user to enter a pin. In some embodiments, the user may configure the security settings through a preference setting on the device, through a setting that the user may designate through the Web browser on a remote server, etc. Within specific applications, the user may configure the security settings through a preference setting for the specific applications.

FIG. 8 illustrates the configuration of the security settings through a preference setting stored locally on the device. As shown in this example, the user has configured the device 805 so that applications such as short message service (SMS), calendar, and contacts book are "locked" or that access to the content of these applications would require a valid password. The user has configured the device to not require a password for accessing applications such as camera function, music application, and the Web browser.

In some embodiments, the device does not allow the user to alter the security settings for particular applications. In one instance, the box 815 drawn around the email application indicates that the security setting for this application may not be changed. Specifically, the email application will always require the user to enter a pin. In another instance, the box 820 drawn around the help function indicates that the user may not be able to alter the security settings to this function. Specifically, the help function will always be available to the user without requiring the user to enter a pin.

Further, in another embodiment, the user may configure the security settings of applications in a different way. In one example, the user may be able to visually drag icons of one or more applications (e.g., email, SMS, calendar, contacts) into a "secure" folder. Once an application has been dragged into the "secure" folder, the application will prompt the user to enter a pin (e.g., a cross-application pin that can lock one or more applications) before the user can access its contents. The user could create multiple "secure" folders so that access to a first "secure" folder requires a first pin and access to a second "secure" folder requires a second pin. In one instance, applications that are outside of the one or more secure folders are always available to users and are not pin protected.

Figure 9:
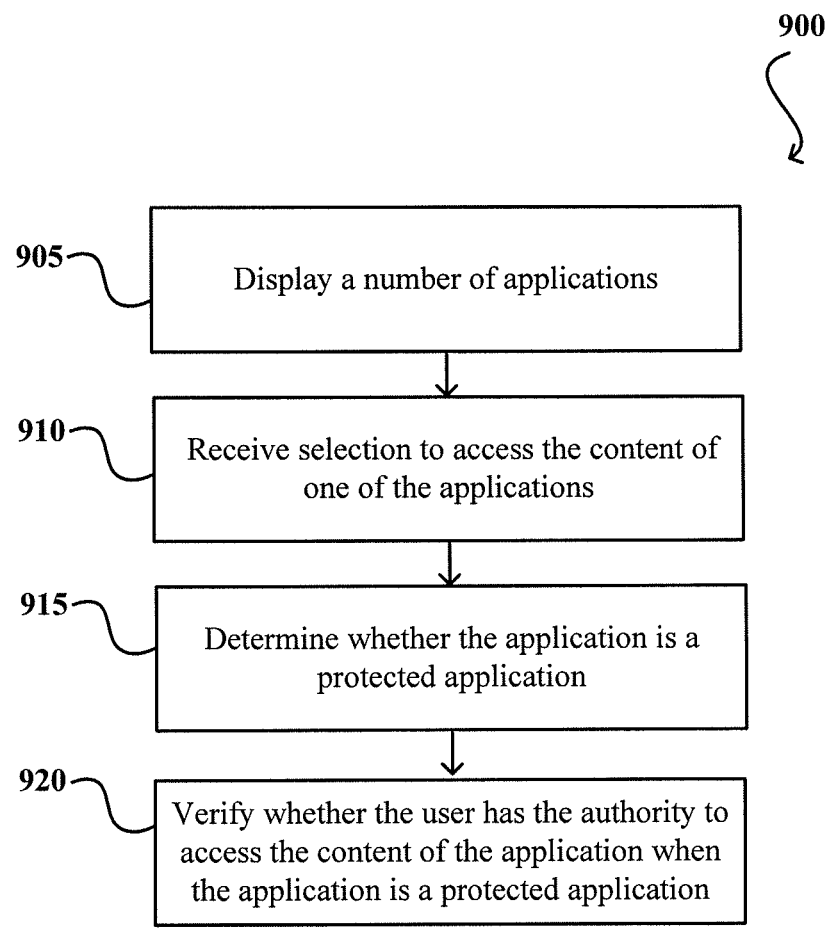
FIG. 9 illustrates an example of a process for enabling a user of a device to gain access to contents of a locked application in an environment with locked and unlocked applications in accordance with various embodiments.

FIG. 9 illustrates an example of a process 900 for enabling a user of a device to gain access to contents of a locked application in an environment with locked and unlocked applications. It should be understood that, for any process discussed herein, there can be additional, fewer, or alternative steps performed in similar or alternative orders, or in parallel, within the scope of the various embodiments unless otherwise stated. As shown in FIG. 9, the process 900 begins by displaying (at 905) a number of applications on the device. Some embodiments display the applications using icons, each icon representing a different application on the device. As described above, each icon may represent one or more applications such as an email application, a calendar application, a contacts application, a photos application, a camera application, or any combination thereof. The device of some embodiments may display the applications differently, such as in a list format, column view, etc.

The process 900 next receives (at 910) selection to access the content of one of the applications. In some embodiments, the user selects to access an application on the device by selecting (e.g., through a touchpad, through a keystroke input, cursor controller operation, etc.) an icon representing the application. Some embodiments enable the user to select to access a group of applications (e.g., via an icon representing a group of applications). This allows the user to gain access to the group of applications upon unlocking a group pin. For instance, instead of selecting a single application, the user may select an icon representing a number of applications (e.g., work email account, corporate contacts, work calendar account) to unlock the group of applications all at once.

The process 900 then determines (at 915) whether the application is a protected application. Some embodiments determine whether the application is a protected application by analyzing the security settings of the application. As described above in FIG. 8, some embodiments enable the user of the device to configure the security settings on the device to determine which applications are pin/password protected and which ones are not. The device of some embodiments does not allow the user to change the security settings on certain applications. For example, an email application that retrieves the user's work emails from an Amazon® exchange server may always require the user to enter a pin/password before the user can access the content of these work emails.

Next, the process 900 verifies (at 920) whether the user has the authority to access the content of the application when the application is a protected application. Upon determining that the application is a protected application, some embodiments verify whether the user has the authority to access the content of the application by verifying the validity of a pin entered by the user and/or by using biometrics recognition techniques (e.g., fingerprint recognition, facial recognition, voice recognition, retinal scan, etc.). In some embodiments, the application is protected by an operating system level pin or a cross-application pin that can lock/unlock one or more applications.

Some embodiments require the user to perform an input (e.g., fingerprinting, speaking a word) to determine whether the user has authorized access to the contents of the application. In some embodiments, the device provides a pop-up window with an entry field allowing the user to enter a pin for verification. As mentioned above, this verification may be performed by comparing the received input with data stored locally on the device or remotely at a remote server. After the device verifies that the user has the authority to access content of the application, the device then displays the contents of the application.

Although process 900 specifically refers to unlocking access to contents of an application, the process may also apply to unlocking access to contents of a certain type of data within an application. For example, the user may designate family photos within the photos application as being locked and therefore require the user to authenticate his identity when he tries to access the contents of the family photos. As another example, the user may designate work-related calendar entries within the user's calendar that includes the user's personal and work schedules as requiring a valid pin in order for the user to obtain access to the contents of the work-related calendar entries.

Figure 10:
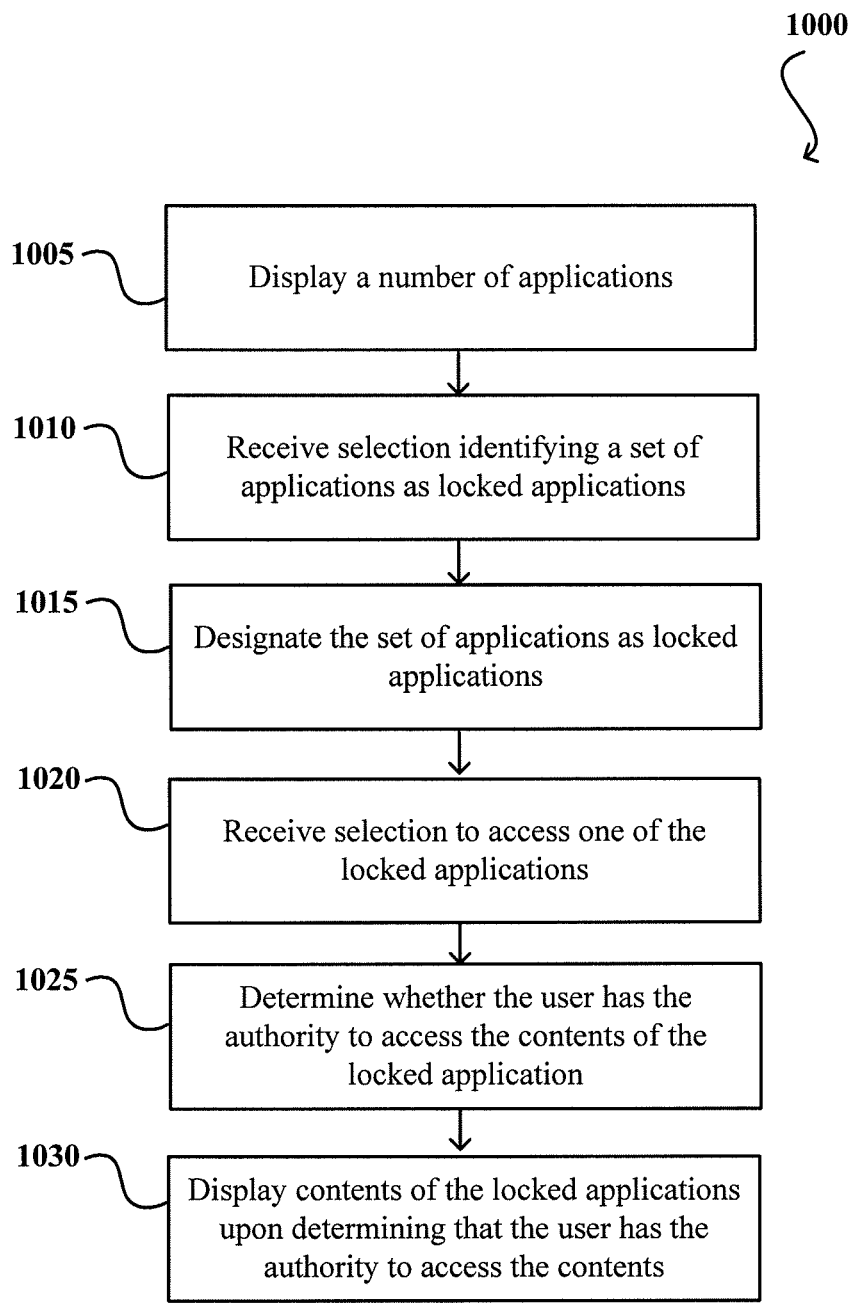
FIG. 10 illustrates an example of a process for enabling a user of a device to configure security settings of applications on the device in accordance with various embodiments.

FIG. 10 illustrates an example of a process 1000 for enabling a user of a device to configure security settings of applications on the device. As described above in FIG. 8, the device of some embodiments enables the user to configure the security settings of applications on the device so that the user may lock the applications that he considers to be confidential while keeping other applications unlocked. As shown in FIG. 10, the process 1000 begins by displaying (at 1005) a number of applications. The applications may include email application(s), calendar application(s), a calculator application, contacts application(s), gaming application(s), Web browser application(s), etc. The device of some embodiments displays the applications by using icons to represent the applications. Some embodiments display the applications in a list format, such as that shown in FIG. 8.

The process 1000 then receives (at 1010) selection identifying a set of applications as locked applications. Some embodiments enable the user of the device to identify the set of applications to lock on the device (e.g., through a configurable setting such as that shown in FIG. 8 above). In some embodiments, the device enables the user to select and modify the status (e.g., locked or unlocked) for each application on the device. In one example, the user may designate to lock a number of applications from a list of application by checking a checkbox next to each application. In another example, the user may modify the status of each application by adjusting a draggable element to indicate the status of each application, such as that shown in FIG. 8. As mentioned above, some embodiments allow the user to modify the status of certain applications and not other applications.

Next, the process 1000 designates (at 1015) the set of applications as locked applications. The device of some embodiments designates the set of applications as locked applications by tagging the applications with metadata such that the device would know if someone attempts to access one of the locked applications. Some embodiments may generate and/or update a list or a lookup table that keeps track of the applications that are locked and unlocked. Moreover, in one embodiment, the operating system of a mobile device includes functionalities that keep track of which applications are locked and which applications are not locked. In some embodiments, the device also displays a lock indicator along with each locked application to indicate to the user the locked status of the application. Some embodiments do not provide the user any visual indicators indicating that the application is locked.

The process 1000 then receives (at 1020) selection to access one of the locked applications. In some embodiments, the user selects one of the locked applications by clicking on a locked application (e.g., by a cursor controller operation, by touch screen, etc.). The process 1000 determines (at 1025) whether the user has the authority to access the contents of the locked application. Some embodiments determine whether the user has the authority to access contents of the locked application by using pin validation. More specifically, in some embodiments, the device displays a pop-up window with an entry field that allows the user to enter a pin to verify that the user has the authority to access the contents of the locked applications. Some embodiments may automatically identify whether the user is an authorized user by performing biometrics identification techniques. As mentioned above, these biometrics identification techniques include facial recognition, iris recognition, fingerprint recognition, etc. Different embodiments may determine whether the user has the authority to access the contents of the application differently.

The process 1000 then displays (at 1030) the contents of the locked applications upon determining that the user has the authority to access the contents of the locked application. Some embodiments further lock or enable a user to lock certain types of data within the application. In some embodiments, the device does not lock the individual application, but lock a certain type of data within the application. For example, the user may want his work emails to be confidential and therefore locked whereas he may want to keep his personal emails unlocked and therefore easily accessible without requiring the user to unlock a password lock.

Figure 11:
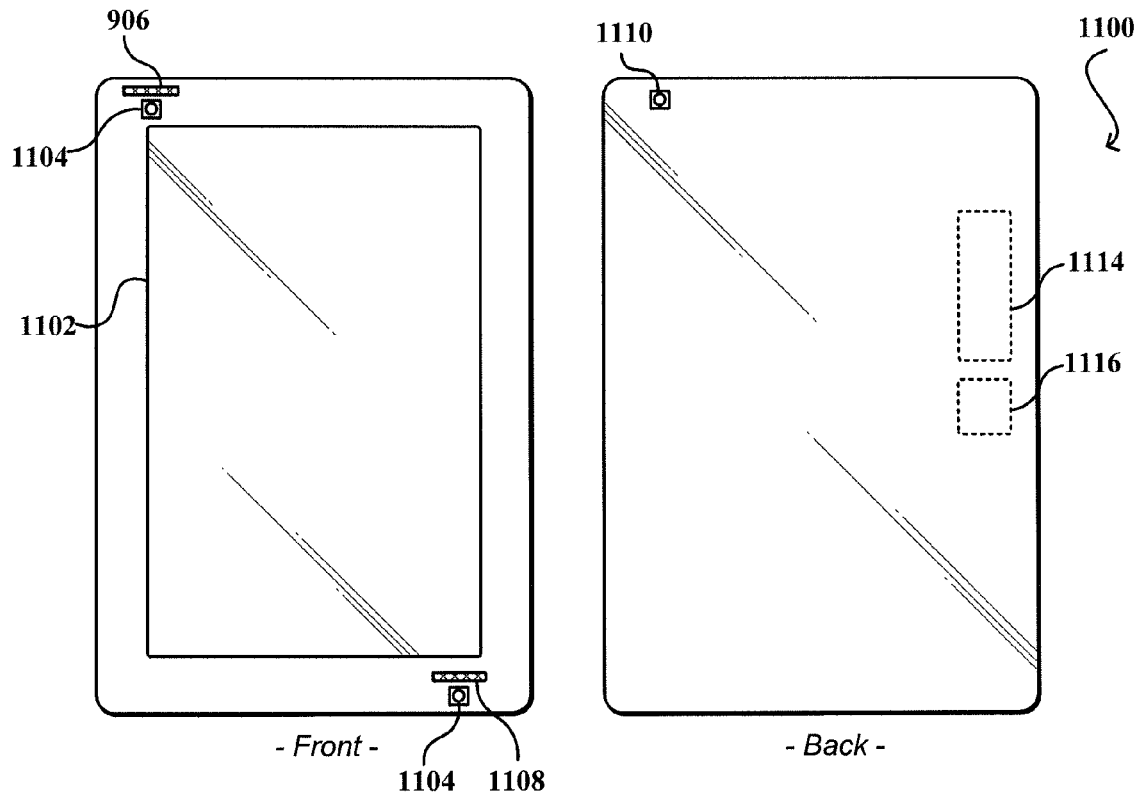
FIG. 11 illustrates front and back views of an example portable computing device that can be used in accordance with various embodiments.

FIG. 11 illustrates front and back views of an example portable computing device 1100 that can be used in accordance with various embodiments. Although one type of portable computing device (e.g., a smart phone, an electronic book reader, or tablet computer) is shown, it should be understood that various other types of electronic device that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 1100 has a display screen 1102 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc.

The example portable computing device can include one or more image capture elements for purposes such as conventional image and/or video capture. As discussed elsewhere herein, the image capture elements can also be used for purposes such as to determine motion and receive gesture input. While the computing device in this example includes one image capture element 1104 on the "front" of the device and one image capture element 1110 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology. The computing device can also include at least one microphone 1106 or other audio capture element capable of capturing audio data, such as may be used to receive user input in certain embodiments. In some devices there may be only one microphone, while in other devices there might be at least one microphone on each side and/or corner of the device, or in other appropriate locations.

The device 1100 in this example also includes at least one motion- or position-determining element 1108 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device. The example device also includes at least one communication mechanism 1114, such as may include at least one wired or wireless component operable to communicate with one or more electronic devices. The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

Figure 12:
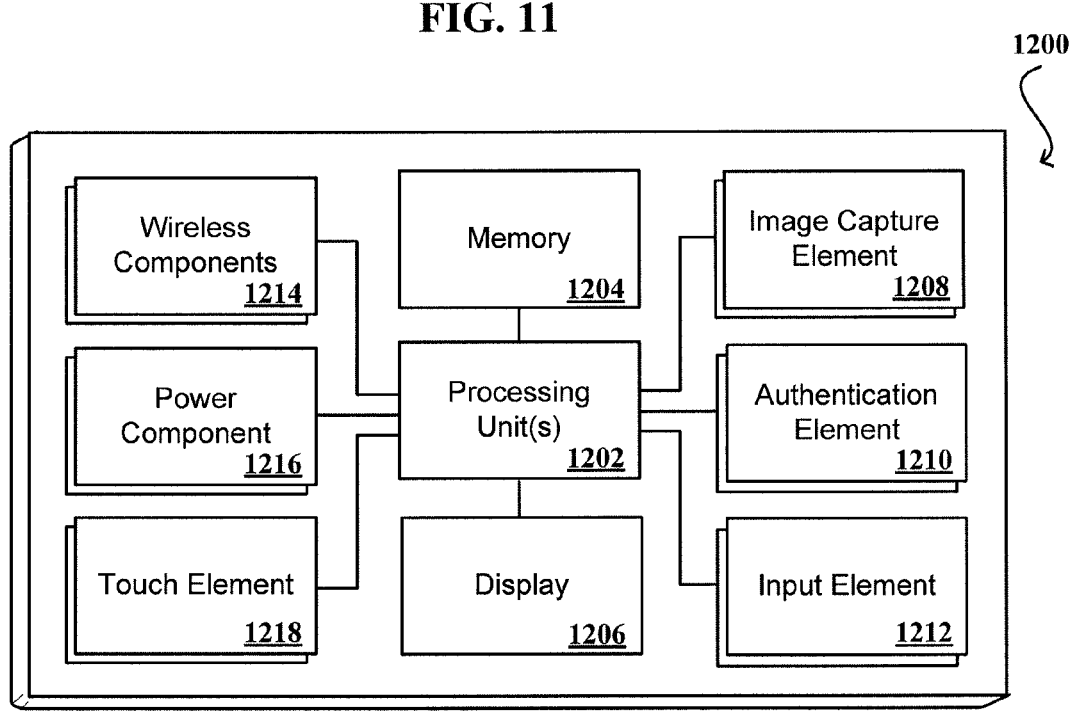
FIG. 12 illustrates an example set of basic components of a computing device such as that illustrated in FIG. 11 in accordance with various embodiments.

In order to provide functionality such as that described with respect to FIGS. 9-10, FIG. 12 illustrates an example set of basic components of a computing device 1200, such as the device 1100 described with respect to FIG. 11. In this example, the device includes at least one processing unit 1202 for executing instructions that can be stored in at least one memory device or element 1204. As would be apparent to one of ordinary skill in the art, the device can include many types of memory, data storage or computer-readable storage media, such as a first data storage for program instructions for execution by the processor 1202, the same or separate storage can be used for images or data, a removable storage memory can be available for sharing information with other devices, etc. The device typically will include some type of display element 1206, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1208, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine movement of the device. An image capture element can include any appropriate technology, such as a CCD image capture element having a sufficient resolution, focal range and viewable area, to capture an image of the user when the user is operating the device. The device can include at least one additional input device 1212 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 1214 operable to communicate with one or more electronic devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 1216 known in the art for providing power to a computing device, which can include capacitive charging elements for use with a power pad or similar device as discussed elsewhere herein. The example device also can include at least one touch- and/or pressure-sensitive element 1218, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc.

The example device includes an authentication element 1210 for verifying that a user has authority to access certain applications and/or data on the example device. The authentication element, in one example, is a biometric device. The biometric device could be a voice recognition device, a facial recognition device, an iris scan recognition device, a retinal scan recognition device, a fingerprint recognition device, or a device that includes one or more of the foregoing functionalities. Also, while pin or password-based authentication could be performed by, for example, processing unit 1202 and memory 1204, in one instance, the pin or password-based authentication can also be performed by the authentication element 1210.

Figure 13:
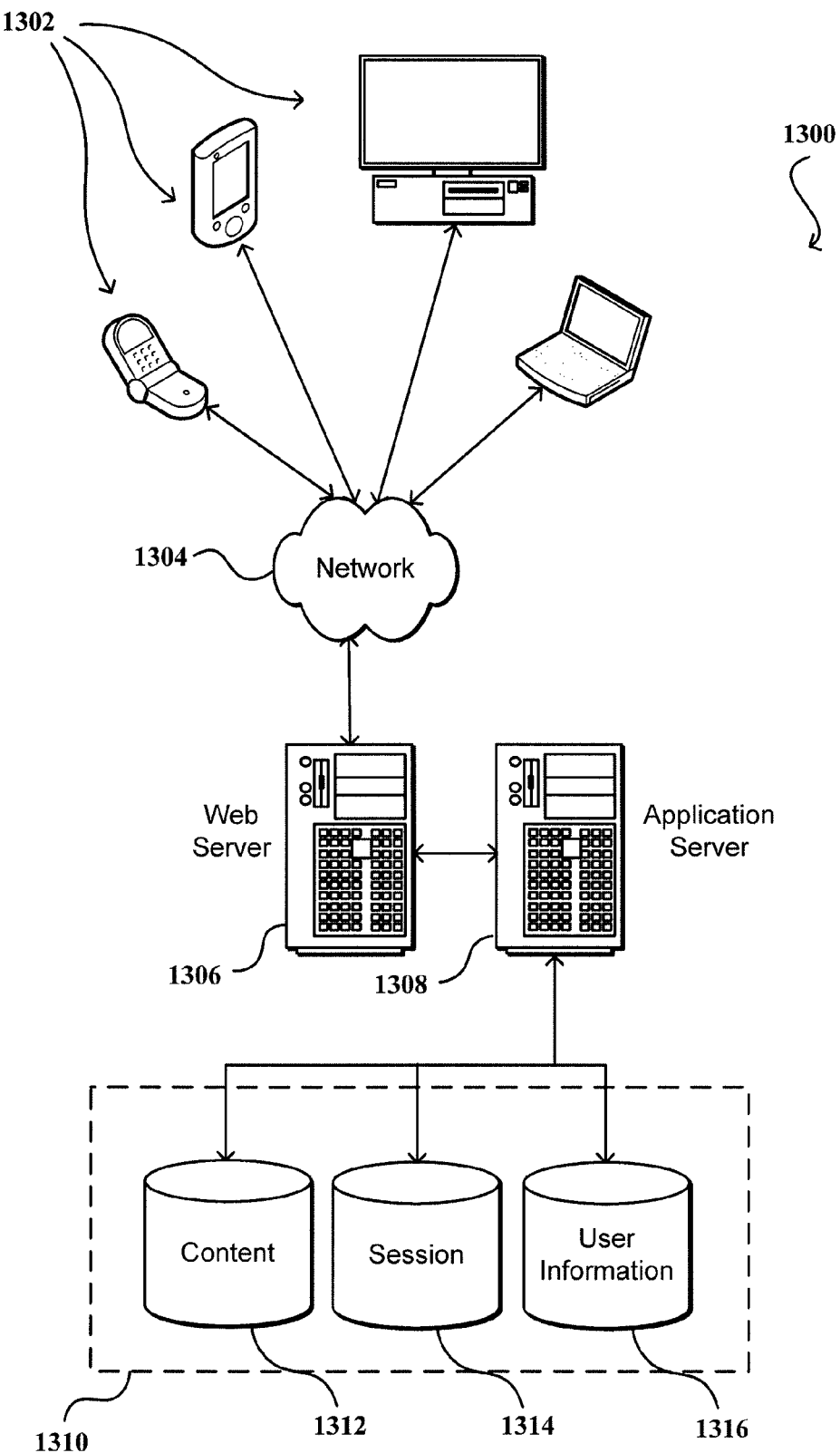
FIG. 13 illustrates an example of an environment in which various embodiments can be implemented.

As discussed, different approaches can be implemented in various environments in accordance with the described embodiments. For example, FIG. 13 illustrates an example of an environment 1300 for implementing aspects in accordance with various embodiments. As will be appreciated, although a Web-based environment is used for purposes of explanation, different environments may be used, as appropriate, to implement various embodiments. The system includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks, an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1306 in the form of HTML, XML or another appropriate structured language in this example. The handling of all requests and responses, as well as the delivery of content between the client device 1302 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing content (e.g., production data) 1312 and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for securing access to content, comprising:
designating at least one first instance of a first type of content having a first attribute from a first application and at least one second instance of the first type of content from a second application for protection on an electronic device via an access mechanism, the access mechanism capable of restricting access to the first type of content within the first application and the second application, the at least one first instance and the at least one second instance being designated based at least in part upon a source of the at least one first instance and the at least one second instance, the electronic device including one or more instances of one or more second types of content having one or more other attributes of each of the first application and the second application that remain unprotected on the electronic device;
receiving a user selection to access an instance of content;
determining a type of the instance of content;
in response to determining that the instance of content corresponds to the one or more second types of content having the one or more other attributes, providing the user with access to the instance of content; and
in response to determining that the instance of content corresponds to the first type of content having the first attribute,
prompting the user for an input to access the instance of content via the access mechanism; and
upon validation of the access mechanism,
providing the user with access to the instance of content for each of the first application and the second application; and
enabling the user to access other instances of the first type of content for each of the first application and the second application without prompting the user for the input to access the other instances of the first type of content via the access mechanism.

2. The method of claim 1, wherein prompting the user for an input to access the instance of content via the access mechanism includes requesting the user for at least one of a pin or biometrics information.

3. A method of enabling a user of an electronic device to access content from multiple applications in a single environment, the method comprising:
designating one or more instances of a first type of content having a first attribute for protection by an access mechanism, the access mechanism capable of restricting access to the first type of content within the multiple applications, the one or more instances being designated based at least in part upon a source of the one or more instances;
receiving a selection to access an instance of the first type of content;
determining that the instance of the first type of content is protected by the access mechanism;
verifying that the user is an authorized user who has the authority to access the first type of content based on an input via the access mechanism; and
enabling the authorized user to select one or more instances of the first type of content from the multiple applications without prompting the user for the input via the access mechanism.

4. The method of claim 3, further comprising:
designating a first system level password for the first type of content and a second system level password for a second type of content having a second attribute.

5. The method of claim 3, wherein security settings for at least one application of the electronic device is not user configurable.

6. The method of claim 3, wherein at least one first application of the electronic device is system level password protected and at least one second application of the electronic device is not system level password protected.

7. The method of claim 3, wherein prompting the user for the input via the access mechanism includes providing an entry object enabling the user to enter a system level password to gain access to the instance of the first type of content.

8. The method of claim 7, further comprising:
receiving, from the entry object, a system level password input by the user; and
enabling the user to have access to the instance of the first type of content upon verifying that the system level password input by the user is valid.

9. The method of claim 8, wherein the system level password input by the user includes at least one keystroke input and a motion input.

10. The method of claim 3, further comprising:
enabling the user to access the one or more instances of the first type of content within more than one of the multiple applications when the user is verified as the authorized user.

11. The method of claim 10, further comprising:
locking the one or more instances of the first type of content after a predetermined period of time.

12. The method of claim 3, wherein verifying that the user is the authorized user who has the authority to access the first type of content comprises at least one of a pin verification, a facial recognition technique, an iris recognition technique, a retinal scan recognition technique, a voice recognition technique, or a fingerprint recognition technique.

13. A non-transitory computer readable medium storing a computer program which when executed by at least one processor enables secured access to content the computer program comprising sets of instructions for:
designating one or more instances of a first type of content having a first attribute for protection by a security feature that is capable of restricting access to the first type of content within more than one of a plurality of applications, the one or more instances being designated based at least in part upon a source of the one or more instances;
receiving, from a user, a selection to access an instance of the first type of content;
determining that the instance of the first type of content is protected by the security feature; and
verifying that the user is an authorized user who has the authority to access the first type of content based on an input via the security feature; and
enabling the authorized user to select one or more instances of the first type of content from multiple applications without prompting the user for the input via the security feature.

14. The non-transitory computer readable medium of claim 13, wherein the input comprises at least one of a pin, a fingerprint, a voice input, a gesture input, or a scanned input.

15. The non-transitory computer readable medium of claim 13, wherein the computer program further comprises a set of instructions for:
displaying the instance of the first type of content when the user is determined to be the authorized user.

16. A method of enabling a user of a mobile device to configure security settings of data on the mobile device, the method comprising:
designating one or more instances of a first type of content having a first attribute as locked content, the one or more instances being designated based at least in part upon a source of the one or more instances;
receiving a user selection to access an instance of the locked content;
determining whether the user has authority to access the locked content;
displaying the instance of the locked content and enabling the user to access one or more other instances of the locked content for multiple applications without determining whether the user has the authority to access the one or more other instances of the locked content in response to determining that the user has the authority to access the locked content; and
restricting the instance of the locked content and restricting the user access to one or more other instances of the locked content for multiple applications in response to determining that the user does not have the authority to access the locked content.

17. The method of claim 16, wherein determining whether the user has the authority to access the locked content comprises:
matching a pin entered by the user with another pin stored locally on the mobile device.

18. The method of claim 16, wherein determining whether the user has the authority to access the locked content comprises:
automatically performing a verification of an identity of the user without requiring the user to perform any manual input.

19. The method of claim 16, wherein the first type of content may be unlocked by a first pin and a second type of content may be unlocked by a second pin different from the first pin.

20. The method of claim 16, wherein at least one application on the mobile device cannot be configured by the user as the locked content or unlocked content.

21. A portable computing device, comprising:
a processor;
a memory device including instructions that, when executed by the processor, cause the portable computing device to:
designate one or more instances of a first type of content having a first attribute for protection by an access mechanism, the access mechanism capable of restricting access to the first content within multiple applications, the one or more instances being designated based at least in part upon a source of the one or more instances;
receive a selection from a user to access an instance of the first type of content;
determine that the instance of the first type of content is protected by the access mechanism;
verify that the user is an authorized user who has the authority to access the first type of content based on an input via the access mechanism; and
enable the authorized user to select one or more instances of the first type of content from multiple applications without prompting the user for the input via the access mechanism.

22. The portable computing device of claim 21, wherein a subset of a plurality of applications of the portable computing device are protected by the access mechanism.

23. The portable computing device of claim 21, wherein the instructions when executed further cause the portable computing device to:
display the instance of the first type of content upon verifying that the user is the authorized user.

\* \* \* \* \*